United States Patent [19]

Green

[11] Patent Number: 5,189,835

[45] Date of Patent: Mar. 2, 1993

[54] DEVICE FOR CONTINUOUSLY IRRIGATING SOIL OF PLANTS GROWING IN INDIVIDUAL POTS

[76] Inventor: Evert Green, 2740 Yacht Club Blvd., Ft. Lauderdale, Fla. 33304

[21] Appl. No.: 822,351

[22] Filed: Jan. 17, 1992

Related U.S. Application Data

[63] Continuation-in-part of Ser. No. 387,528, Jul. 31, 1989, abandoned.

[51] Int. Cl.$^5$ .............................................. E03B 13/00
[52] U.S. Cl. .................................................... 47/80
[58] Field of Search .................. 47/80, 81, 59, 63, 64, 47/79

[56] References Cited

U.S. PATENT DOCUMENTS

| | | | |
|---|---|---|---|
| 4,001,968 | 1/1977 | Green | 47/80 |
| 4,245,434 | 1/1981 | Green | 47/80 |
| 4,807,394 | 2/1989 | Lyon | 47/79 |
| 4,885,870 | 12/1989 | Fong | 47/79 |

Primary Examiner—David A. Scherbel
Assistant Examiner—Michele A. Van Patten
Attorney, Agent, or Firm—Malin, Haley, DiMaggio & Crosby

[57] ABSTRACT

A device comprising a porous, open-celled block, such as wood or foam plastic, having substantially parallel, opposed, planar major surfaces and adapted in size to support a single flower pot. A plastic tape, which may be perforated or unperforated, is wrapped around the block and covers at least half of each of the major surfaces of the block. The tape has a thin, single-particle-thick layer of quartz sand attached to the inner surface of the tape in close, non-adherent relation with the major block surfaces. The sand particles are interspersed with a network of capillary spaces which are conductive to lateral spreading of water along the layer.

The invention also includes a support block of a predetermined size and height having a single side panel that includes the plastic perforations and the quartz sand single layer proceeding up to the top plastic layer on the styrofoam block.

The invention also shows an alternate embodiment using a terra cotta or clay plant pot with no drain hole in the center bottom surface of the pot used in conjunction with a tray matting, a capillary layer which controls the water flow.

13 Claims, 4 Drawing Sheets

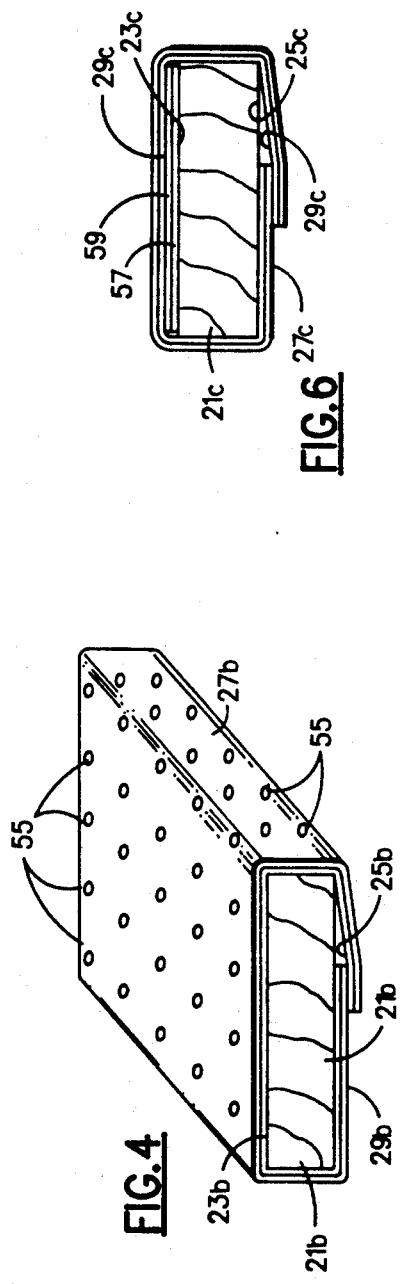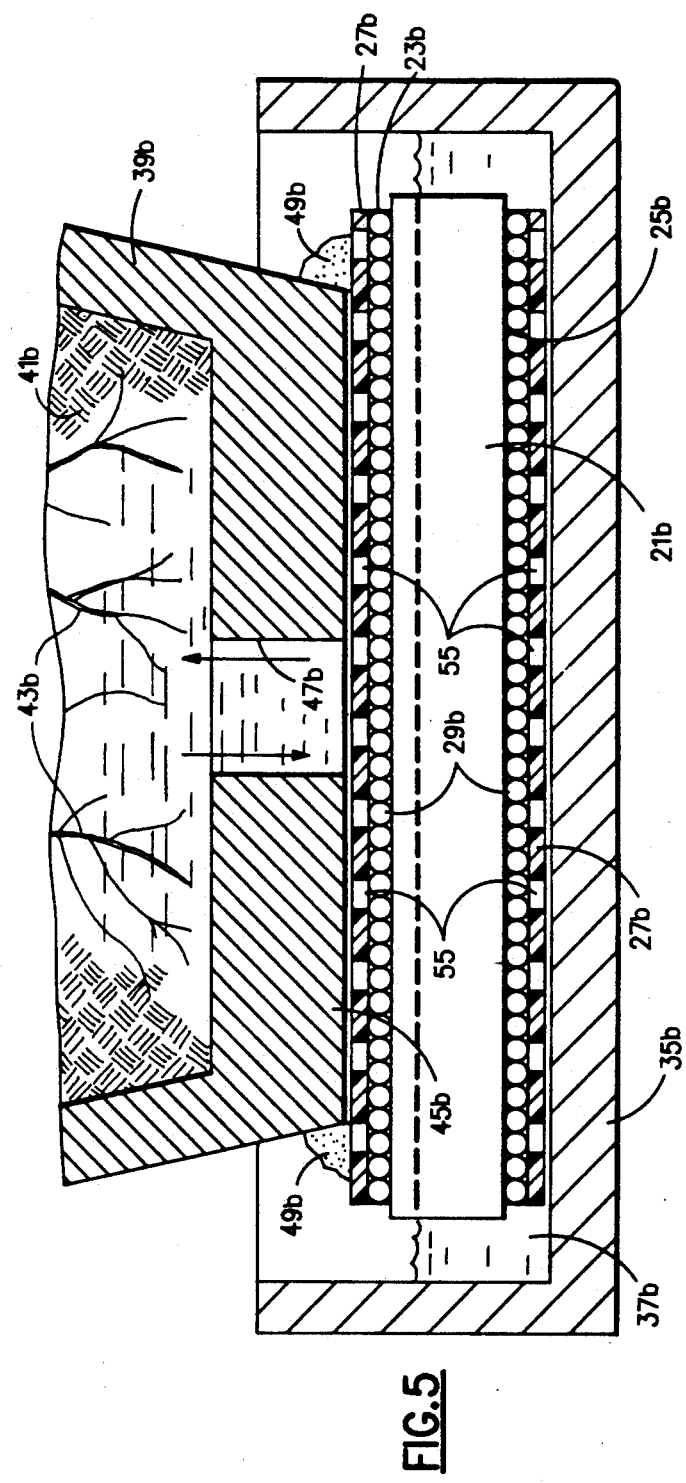

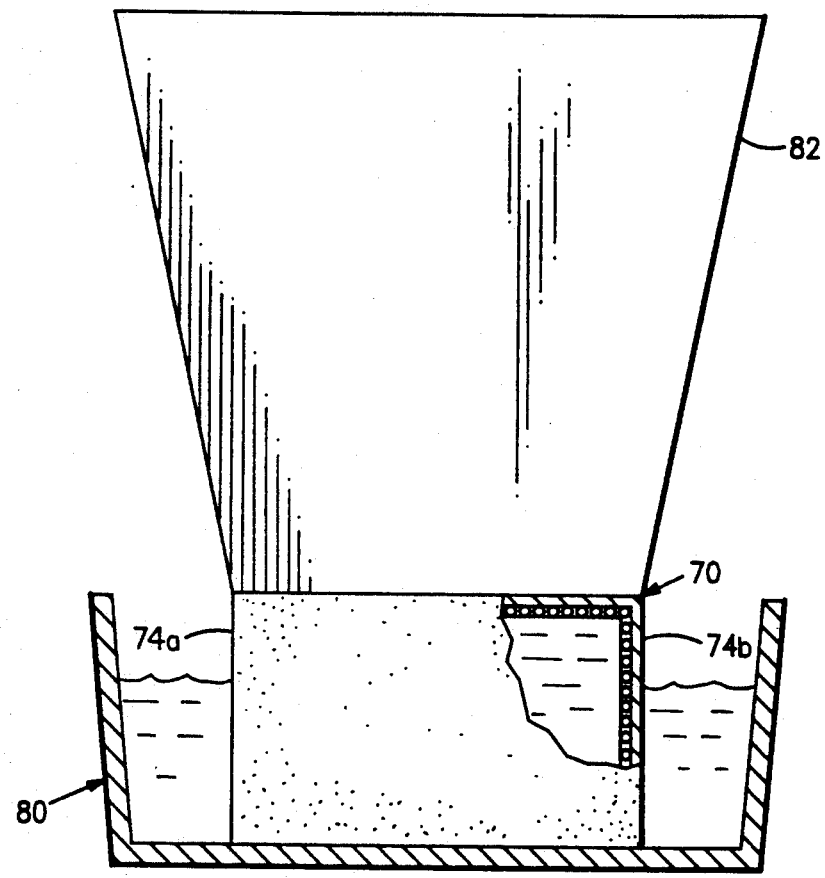
FIG. 8
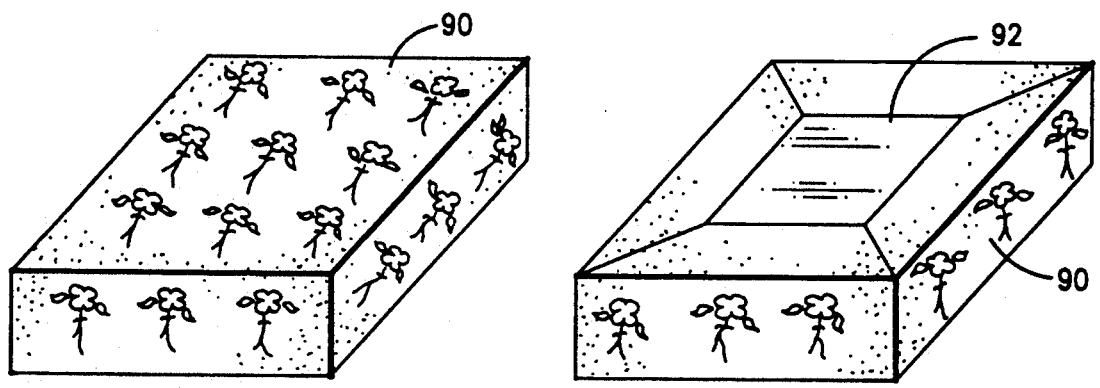
FIG. 9
FIG. 10

DEVICE FOR CONTINUOUSLY IRRIGATING SOIL OF PLANTS GROWING IN INDIVIDUAL POTS

This application is a continuation-in-part of U.S. Ser. No. 07/387,528 filed Jul. 31, 1989 by applicant and now abandoned.

BACKGROUND OF THE INVENTION

1. Field of the Invention

This invention relates to a novel device for continuously irrigating the soil of plants that are growing in individual pots, and particularly to a novel device which is responsive to the plants' demands for water for growth and the removal of waste. The novel device is especially adapted for use in homes and offices where the ambient conditions are not optimized for growing plants. This invention relates to apparatus for controlling the amount of water that is supplied to one or more plants in accordance with the requirements of each individual plant. The invention includes a styrofoam plant pot support block having a specific height for a given plant pot size covered on five sides by a capillary sheet having a sand layer on one side only. The irrigation system is designed for controlled flooding and draining of container-grown plant production for plantscape at home. In an alternate embodiment, applicant has found that a clay individual plant pot having no drain hole can be utilized in conjunction with the capillary mat in a tray to control the water flow to the plant through the clay without a styrofoam block.

2. Description of the Prior Art

It is generally believed there is a particular moisture environment for plants that will insure optimum growth of the plants in pots. Too little water will not allow the plant to grow, as the plant requires water to aid in photosynthesis and its other metabolic processes. Similarly, too much water will not allow the plant to properly grow, as an overabundance of water in the soil surrounding the plant roots will reduce the amount of air in the soil. Air is required by the plant in combination with the proper amount of water for the operation of the plants' metabolism. In addition to maintaining the proper moisture content in the plant, it is desirable to maintain a continuous flow of water to the plant along with the continuous removal of water from the plant in accordance with the plant's needs. An adequate and continuous supply of water to the plant insures proper plant growth and if the water that is being supplied to the plant includes a nutrient and/or chemical, continued flow of water to the plant insures that the nutrient and/or chemical will be continually supplied to the plant. The continuous removal of the water from the plant insures that the waste products of the plant are removed from the vicinity of the plant, thus preventing water immediately about the plant from becoming stagnant.

The water that is supplied to a plant and that is in the vicinity of the roots of the plant is known as capillary water. Capillary water is held loosely in the soil and as the roots of the plant absorb water, the capillary water is drawn by capillary action from moister particles of the soil to the drier particles of soil immediately adjacent the plant roots. This cycle repeats itself as the plant roots absorb water from the soil immediately adjacent the roots.

Plants are capable of regulating the amount of water they require for optimum growth when they are allowed to selectively choose the amount of water they will utilize. Of course, merely placing the plant in a reservoir of water will not allow the plant to regulate the amount of water to be supplied to it to insure optimum growth. The water in a standard earthenware flower pot is transferred to the plant through the earthenware walls of the flower pot and through a central opening in the bottom of the flower pot. In this type of flower pot, it is rare for water to reach the interior of a pot, as usually the soil adjacent the inside walls of the flower pot and adjacent the central opening of the flower pot are the only areas that are moist. Additionally, in a standard flower pot, there is no provision for a continuous circulation of water to and from the plant. Thus, with a standard flower pot arrangement, it is difficult to continuously feed nutrients and/or chemicals to the plant since there is no continual circulation of water to the plant. Similarly, as there is no removal of water from the plant, the waste products remain with the plant, inhibiting to a certain extent the growth of the plant. Other self-watering devices, such as wicks, etc., suffer from not being able to circulate water to the plant or being able to insure that the soil adjacent the roots of the plant is moist so it can feed the plant through the roots of the plant.

My prior U.S. Pat. Nos. 3,193,970; 3,220,144; 3,778,928; 4,001,968; 4,211,037; and 4,245,434 describe various prior methods and devices for continuously irrigating the soil of plants that are growing in individual pots and which are capable of insuring optimum growth of the plants. My teachings and the devices and methods disclosed in these patents are still applicable to the irrigation of the soil of the container-grown plants in commercial horticultural establishments, such as hot houses and florist shops.

However, there is a need for a device for use with a single flower pot which employs my previous teachings and which is especially adapted by low cost, simplicity of construction, and ease of use for plants that are growing in containers in houses or offices where the environment is designed for the comfort and enjoyment of the residents and not optimized for growing the plants.

Applicant has determined that the use of a supporting block for an individual potted plant that is controlled in size, such as block height, and controls the contact or capillary sheet panel with sand on one side only greatly enhances the result for regulating the proper transflow of water and minerals to the potted plant. The special configuration of the support block, the capillary sheet covering, and the particular sand layer panel all contribute to the final operational product. Applicant has also determined that by adjusting the height of the block which controls the distance above the bottom of a container that the block sits in, in proportion to the diameter of the plant pot, excellent results are achieved.

In an alternate embodiment, applicant has also found that a terra cotta or clay pot with a plug hole or no drain hole can be employed in conjunction with capillary matting in a tray to provide and retain water within the potted plant without stagnation problems.

OBJECTS OF THE INVENTION

An object of this invention is to provide a novel device for use with a single flower pot for continuously irrigating the soil of plants growing in individual pots.

A further object of this invention is to provide a device of the type just described that is particularly adapted for use in homes and offices.

Still another object of this invention is to provide a novel device of the type described that is simple in construction, is low in cost, and is easy to make and use.

It is another object of this invention to provide an improved individual plant pot irrigation device that utilizes a block of a predetermined size that supports the plant pot, while at the same time meters proper flow of water and nutrients to and from the plant.

It is another object of the invention to provide an improved plant pot and irrigation system using a clay pot without a watering hole or drain hole in conjunction with a tray and capillary sheet and matting to eliminate stagnation, while still retaining large amounts of water in the potted plant for the benefit of the plant.

In accordance with these and other objects which will become apparent hereinafter, the instant invention will now be described with particular reference to the accompanying drawings.

SUMMARY OF THE INVENTION

The foregoing objects can be achieved with the novel device for continuously irrigating the soil in a flower pot having a bottom wall and a drain hole through that wall. The novel device comprises a porous, open-celled block having substantially parallel, opposed, planar, major surfaces and adapted in size to support a single flower pot. A perforated or unperforated plastic tape is wrapped around the block and covers at least half of each of the major surfaces. A thin, single-particle-thick layer of quartz sand is attached to the inner surface of the tape in close non-adherent relation with the major block surfaces. The sand particles range in size from about 0.002 to 0.250 millimeters and are interspersed with a network of capillary-sized spaces that are conducive to spreading water laterally along the layer in a controlled manner.

For use, the novel device is placed on one major surface thereof in a shallow dish that is partially filled with water. The flower pot to be irrigated is placed on the other major surface of the novel device. Water saturates the porous block and then, by capillary action, is drawn along the thin sand layer and the surface of the tape to the vicinity of the drain hole in the flower pot where it is taken in by the soil in the pot. Osmotic action by the plant draws water from the soil for growth and also for delivering waste products of the plant to the soil. Capillary action also causes water and the waste products in the soil to travel to the block.

Thus, the novel device provides a continuous circulation of water to the soil in the flower pot, which water is available according to the demands of the plant in the pot. In this way, an optimum amount of water, nutrients, and oxygen are continuously available for plant growth. The device is simple in construction, low in cost, and easy for a lay person to use.

BRIEF DESCRIPTION OF THE DRAWINGS

FIG. 4 is a perspective view of a third embodiment of the novel device.

FIG. 5 is a fragmentary sectional view of the third embodiment shown in FIG. 4 positioned for use in irrigating the soil in a flower pot.

FIG. 6 is a side elevational view of a fourth embodiment of the novel device.

FIG. 8 shows a side elevational view with the water container partially in cross-section showing support block and a plant pot in an operational condition.

FIG. 9 shows a perspective view from the top.

FIG. 10 shows a bottom perspective view of the invention with contact decorative paper used around the styrofoam block.

DETAILED DESCRIPTION OF THE INVENTION INCLUDING THE PREFERRED EMBODIMENTS

Figure 2:
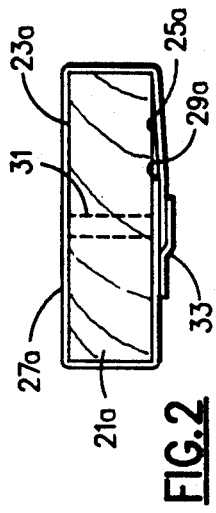
FIG. 2 is a side elevational view of a second embodiment of the novel device.

The following description of some of the preferred embodiments of the concepts of this invention is made in reference to the accompanying figures. Where an individual structural element is depicted in more than one figure, it is assigned a common reference numeral for simplification of identification and understanding.

Figure 1:
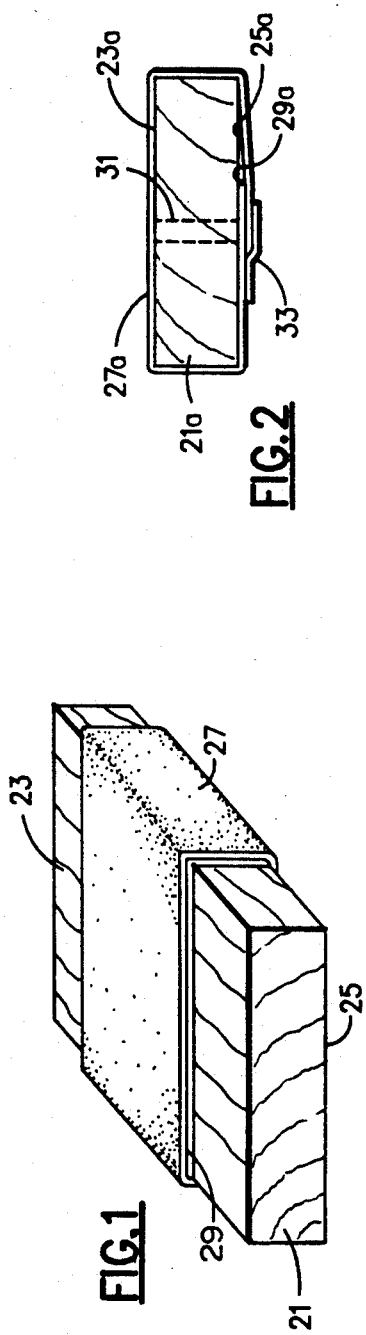
FIG. 1 is a perspective view of a first embodiment of the novel device.

The novel device shown in FIG. 1 includes a block 21 of dried cypress wood having opposed, substantially parallel, planar major surfaces 23 and 25 about 9 cm long and 9 cm wide. The block 21 is about 1.5 cm thick. A solid, water-impervious tape 27 about 5.0 cm wide is wrapped around about the middle of the block 21. The tape 27 has an inner surface that is coated with a monolayer 29 of quartz sand particles that are held to the tape surface by a pressure-sensitive adhesive. The outer end of the tape 27 is held to itself by a tab (not shown).

FIG. 2 illustrates a second embodiment of the novel device which is similar in structure and size to the first embodiment shown in FIG. 1, except that the block 21A is made of dried white pine and there is a 1.0 cm hole 31 through the block 21A. Also, a tab 33 is shown holding the tape 27A wrapped around the block 21A.

The blocks 21 and 21A may be made of any porous, open-celled, substantially solid material. Any dried wood may be used, although soft woods are preferred because they have greater porosity. Also, synthetic materials which are open-celled foams, such as polystyrene, may be used. Wood is preferred to synthetic materials because the xylem of the wood holds more cohesive water when saturated, whereas synthetic foams hold capillary water by adhesion. Since the xylem of wood has more potential energy, it can release more capillary water as required by the type and size of the plant growing in the irrigated soil through the sand layer 29 to the plant root system by osmosis in unlimited supply. The synthetic foam, with only a cohesive water film, has a limited supply of capillary water and is best for small plants like African violets.

An important feature of the novel device is the tape 27 and 27A that is wrapped around the block 21 and 21A. The tape has a thin, single-particle-thick layer of quartz sand particles that are interspersed with a network of capillary spaces which is conducive to the lateral flow of water from a point of local application so as to spread laterally along the layer into areas for even distribution. If the sand layer is excessively thick, it tends to hold the water in a form that may be likened to an absorbent gel, which is undesirable as tending to the creation of anaerobic conditions. The quartz sand particles, which preferably have become somewhat rounded as the result of being windblown, are small so that most of them are less than 0.25 mm in diameter and preferably are of graded size ranging from about 0.002 through 0.05 mm and 0.1 mm with a maximum of approximately 0.25 mm. The sand is applied so as to provide a substantially continuous coating approximately one grain of sand in thickness.

The sand layer contains a network of capillary passages which I have found to exercise an extraordinarily great effect in inducing lateral capillary spread of water applied in a localized portion of the sheet. This is important because it assists greatly in maintaining aerobic conditions which depend on adequate drainage for the catalytic action. Because quartz sand is an amphoteric substance, it has both acidic and basic properties. It is evident that during capillary travel a catalytic effect is produced on plant nutrients as by ionization which makes them more readily absorbed into the living plant for contributing to its growth. As aforesaid, there is migration in the capillary passages, both to and from the zone of the plant roots, with the result that some of the nutrients contained in the soil become influenced by the sand layer during the respiration process of the plant in a manner that is favorable to healthy plant growth. I have found that, by the employment of the sand layer, the vigor of plant growth appears to be markedly improved. This is the case even though the sand layer is positioned below the flower pot, which is filled with the soil in which plants are being grown.

When water is supplied so as to be slightly in excess of that which is drawn up into the plants with a certain amount of drainage of the excess moisture, the water supply is kept fresh and the excrement from the plant is taken away, with the resultant creation of a combination of conditions which I have found to be extremely favorable to plant growth, including the beneficial effects of the quartz sand layer. The sand layer may be prepared on any plastic sheet material. The sand layer is preferably supported on a vinyl tape. By applying a conventional solvent to the surface of the vinyl tape, it can be rendered sufficiently sticky before the solvent evaporates to cause the sand to adhere thereto as a thin layer. Alternatively, a polyethylene tape may be used and, by applying a conventional water-resistant adhesive that is sticky prior to drying, the sand particles can be caused to stick thereto. As aforesaid, the sand is applied as a thin coating with the sand particles sufficiently closely spaced to provide a network of capillary spaces conducive to lateral spread of water therealong. The sand layer should not be built up so as to be of multiple grain thickness, both for efficiency and reduction of weight, which is a cost factor in shipment.

Figure 3:
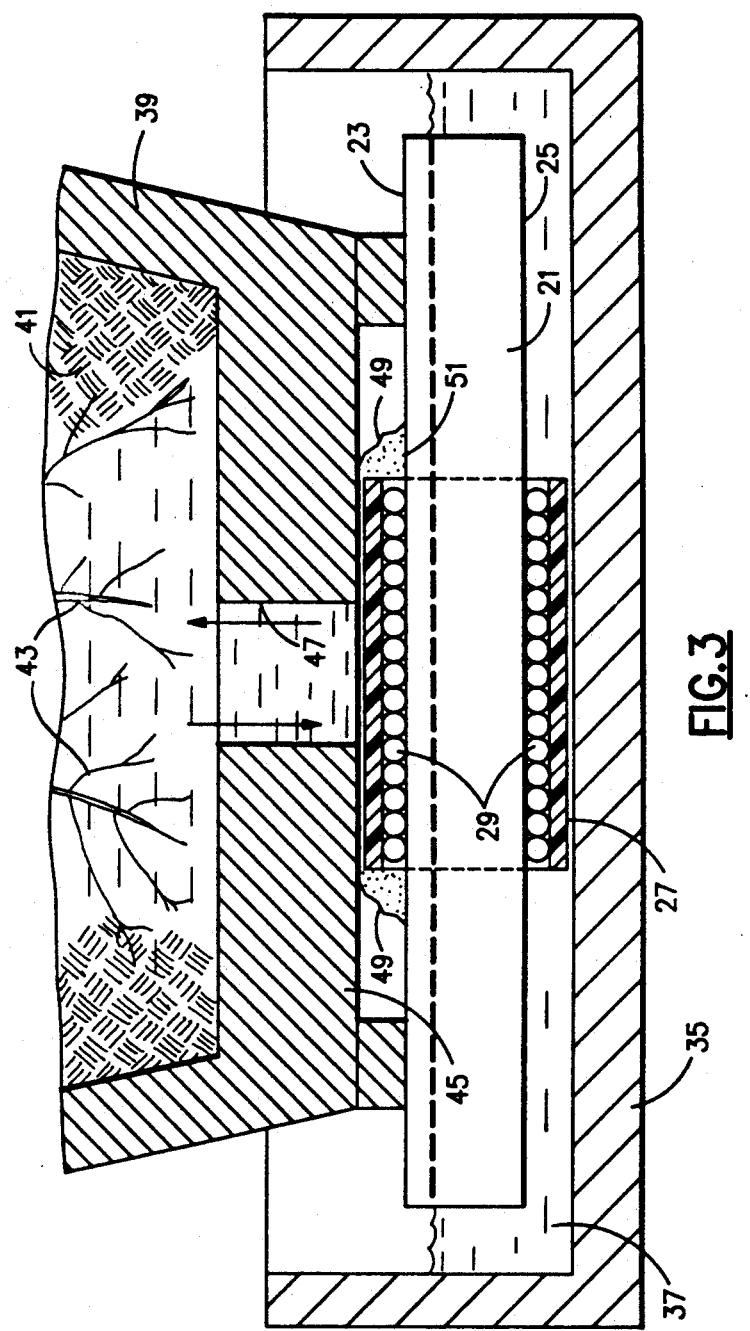
FIG. 3 is a fragmentary sectional view of the first embodiment shown in FIG. 1 positioned for use in irrigating the soil in a flower pot.

FIG. 3 shows the novel device of FIG. 1 installed in a shallow container 35 that is partially filled with water 37 so that the block 21 is immersed in the water 37 and the tape 27 extends both below and above the block. A flower pot 39, containing soil 41, and the root system 43 as a plant growing in the soil rests on the upper surface 23 of the block 21. The pot 39 has a bottom wall 45 with a drain hole 47 therein. This structure, which is easily arranged in any home or office, will serve to explain the advantageous use of the novel device. To assure good physical contact between the bottom wall 45 of the pot 39 and the tape 27, the upper major surface 23 of the block 21 may be higher in its center, while still being substantially planar. In FIG. 3, the width of the tape 27 is less than the width of the bottom wall 45 of the pot 39.

A plant is rooted in the soil 41 and, as a result of the osmotic absorption from the soil 41 into the root system 43, the moisture content of the soil is depleted with the result that capillary forces are set up within the soil that are transmitted through the drain opening 47 in the bottom of the container 39 so as to cause an upward migration of moisture into the soil 41 as indicated by the upwardly directed arrow. At the same time, excretions from the plant have been found to migrate through the drain hole 47 in the bottom of the container 39 as indicated by the downwardly directed arrow in FIG. 3, the excretions becoming mixed with excess water that drains from the interface between the tape 27 and the bottom wall 45 of the pot 39. This combined action exerted by the root system 43 of the plant is of considerable magnitude, especially in the case of the larger plants, with the result that a hydraulic pool 49 of water tends to build up around the margin of the tape 27 and at the bottom of the pot 39. Moreover, this buildup of water tends to occupy the opening 47 in the bottom wall 45 of the pot 39 so that the opening 47 provides an avenue of travel for water taken up by the roots of the plant, as well as excretions from the plant. The hydraulic pool 49 is believed to serve as an exchange station for absorption and excretion. In the case of a porous container, such as the conventional clay pot which has substantial permeability to moisture, the water taken into the soil of the container in substantial amount also may travel from the tape 27 through the permeable material of which the container is composed. One of the advantages of the embodiments of this invention is that a standard size clay or plastic flower pot, one of various sizes up to the capacity of the support area, may be used and, when so used, may be placed on the upper surface 23 of the block 21.

The capillary movements of the water as hereinabove described also have been schematically shown in FIG. 3. These movements are indicated as involving the capillary flow of water from the interface between the layer 29 and the block 21 into the soil in the container 39 with a concomitant migration of excretions downwardly through the drain opening 47 to the interface between the sand layer 29 and the block 21 where the excretions are carried off for drainage in a direction indicated by the horizontal arrow with excess water that is supplied by the water supply means to the interface.

Regardless of theoretical considerations, I have found as the result of prolonged experimentations in the culture of plants that the apparatus and method hereinabove described are attended with outstanding results in the growth of strong healthy plants. The improvements are attributed to the controlled supply of water for sustaining healthy plant growth under conditions where the water supply is fresh, while at the same time removing the products which are excreted by the growing plants. Moreover, the growth of harmful algae or the occurrence of any other anaerobic conditions is virtually eliminated. It also is indicated that the nutrients taken up by the plant are supplied in a form believed to be due to ionization catalyzed by the sand layer catalyst which is favorable to plant growth.

FIG. 4 illustrates a third embodiment of the novel device which is similar in structure and size to the first embodiment shown in FIG. 1, except that the tape 27B and the sand layer 29B that is adhered thereto covers substantially the entire major surfaces of the block 21B, and also the tape 27B is perforated with an array of perforations 55. The block 21B may be made of wood or foamed plastic and may have a hole therethrough as described above.

The tape in any of the embodiments may be perforated. Where the tape is wider than the bottom wall of the flower pot to be irrigated, the tape should be perforated to provide capillary passages for water to flow from the sand layer on the inner surface of the tape to the outer surface of the tape. The perforations 55 are capillary sized and are typically 0.117 to 0.020 mm in their average dimension. The perforations 55 may be arranged in any geometrical array and in any desired spacing.

FIG. 5 shows the novel device of FIG. 4 installed in a shallow container 35B that is partially filled with water 37B and is otherwise similar to the arrangement shown in FIG. 3. However, because the tape 27B is wider than the bottom wall 45B of the pot 39B, the bulk of the water flow is through the perforations 55 in the tape 27B by capillary action. Also, the hydraulic pool 49B tends to build up adjacent the lower edge of the bottom wall 45B on the tape 27B. The functioning of the system is otherwise similar to that described with respect to FIG. 3. It should be mentioned that experience has shown that the wider the tape, the slower will be the amount of water transferred to and from the soil in the pot.

FIG. 6 illustrates a fourth embodiment of the novel device which is similar in structure and size to the third embodiment shown in FIG. 4, except that the device includes a layer of horticultural matting 57 adjacent the upper surface 23C of the block 21 and a sand-coated auxiliary layer 59 of perforated plastic film between the matting layer 57 and the sand layer 29C. The matting layer 57 provides a reservoir for storing additional water in a readily available form for a larger plant. The presence of a reservoir does not affect the rate of water flow in the capillaries of the novel device, but does make more water readily available.

Figure 7A:
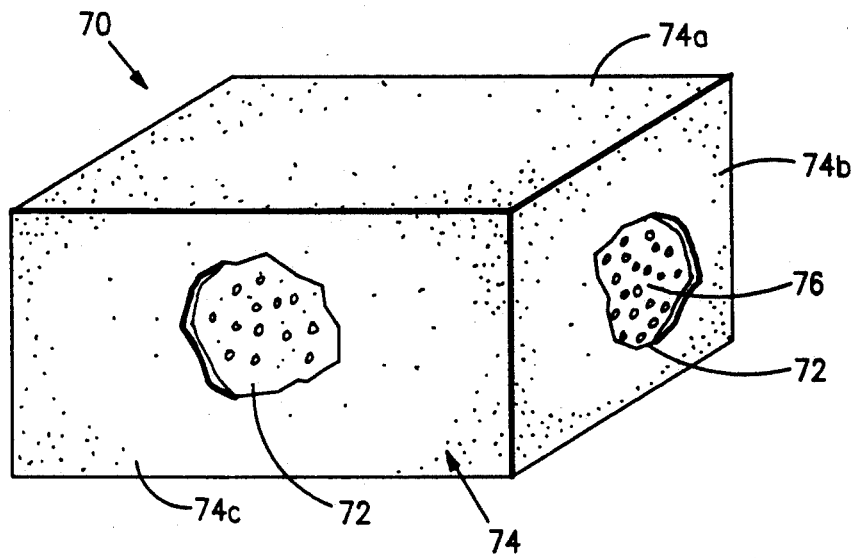
FIG. 7A shows a perspective view of an improved support block for a potted plant in accordance with the present invention that is used in a container that holds water to support a plant pot.
Figure 7B:
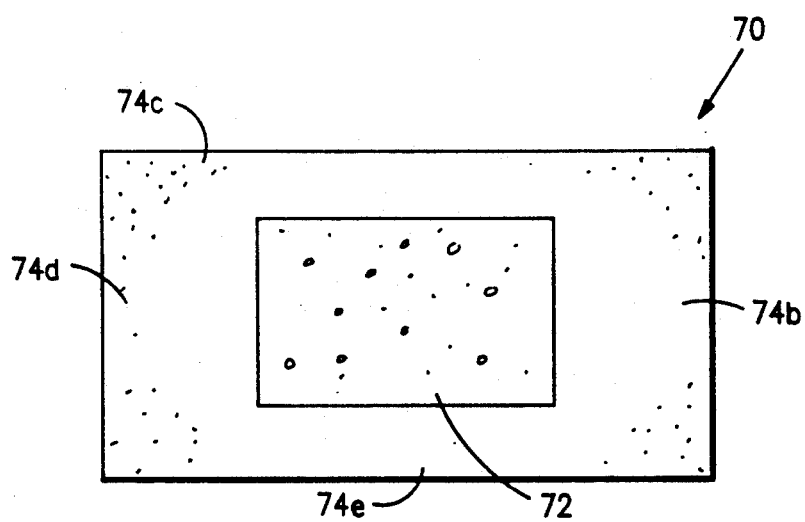
FIG. 7B is a bottom plan view of the support block shown in FIG. 7A.

Referring now to FIG. 7, an improved support block is shown that is comprised of a rectangular styrofoam block 72 having a plastic cover broadly shown as 74 which may be made up of conventional contact paper or a conventional plastic sheet as described herein. In addition, the top panel of the plastic sheet 74a includes perforations and holes that are spaced appropriately and sized as described herein. Of particular note is that particles of silica sand 76 are disposed only along one panel 74b along the styrofoam block 72. Thus, the water and nutrient exchange is dramatically controlled using only one panel 74b that allows access to the top panel 74a on the top of the block where the plant is mounted. Applicant has found that this allows for complete flooding of a container holding the support block and then the plant will seek its own usage of the water in the container. Using only one panel completely controls the flow of water to the top panel 74a. Note also that the bottom panel has been specifically conformed to have overlapping of the plastic sheet shown as overlap panels 74b, 74c, 74d, and 74e which exposes a significantly large area of the styrofoam block 72 which, it is believed, allows water penetration around the styrofoam block through the edges of the panels that are exposed.

Referring now to FIG. 8, a water holding container 80 which has a water impervious cylindrical or conical truncated shape with a flat bottom and an open top is used and receives a support block 70 in accordance with the invention as shown in FIG. 7A. The support block is supported in the middle of the container 80 and receives a typical pot 82 that houses an individual plant. A water level is shown in FIG. 8 in a typical amount that can be used by the plant in pot 82. Using this configuration, applicant has determined that the single sand or silica disposed on one side panel and the top panel greatly improves the efficiency of the irrigation system.

In yet another alternate embodiment, applicant has discovered that the use of a terra cotta or clay plant pot having no drain hole in the center bottom can be disposed in a capillary sheet and mat environment to allow retention of water by the pot without stagnation.

Applicant has determined that the height of the block is an important factor in the overall operation of the device. In particular, applicant has found that a ⅜" high block is ideally suited for use with a typical plant pot that has a 4" diameter. Applicant also believes that a linear relationship based on that would be appropriate so that block heights and plant pot diameter ratio of the same amount would continue to produce ideal results.

In accordance with applicant's invention, applicant has provided in essence a free energy block for the hydraulic transfer of water and nutrients between an individually potted plant and its pot and a reservoir which can also be individual to provide a perfect hydraulic balance. All that is required is watering the individual container using the support block that can be wood or styrofoam and in condition with the particular ornate coverings exhibited by the invention. The operation of the invention is superior to using a singular bed or tray as shown in the prior art.

The foregoing figures and descriptions thereof are provided as illustrative of some of the preferred embodiments of the concepts of this invention. While these embodiments represent what is regarded as the best modes for practicing the invention, they are not intended as delineating the scope of the invention, which is set forth in the following claims.

What is claimed is:

1. A device for continuously irrigating the soil in a flower pot having a bottom wall and a drain hole therethrough, said device comprising:
   a) a porous, open-celled block having substantially parallel, opposed, planar major block surfaces, adapted in size to support a single flower pot thereon;
   b) a plastic tape wrapped around said block covering at least half of each of said major block surfaces, said tape having an inner tape surface facing said major block surfaces; and
   c) a thin, single-particle-thick layer of quartz sand attached to said inner tape surface and in close, non-adherent relation with said block surfaces.

2. The device defined in claim 1, wherein said thin layer consists essentially of a substantially continuous coating approximately one grain in thickness of quartz sand particles essentially in the size range from about 0.002 to 0.250 millimeters that are interspersed with a network of capillary spaces that are conducive to lateral spreading of water along said sand layer.

3. The device defined in claim 1, wherein said thin sand layer is held to said tape with a layer of pressure-sensitive adhesive.

4. The device defined in claim 1, wherein said block consists essentially of dried wood with the rings of xylem thereof extending to said major block surfaces.

5. The device defined in claim 4, wherein said block consists essentially of a soft wood selected from the group consisting of cypress and white pine.

6. The device defined in claim 1, including a layer of horticultural matting between said tape and one of said major block surfaces.

7. The device defined in claim 1, comprising a substantially rectangular block of soft wood about 10 cm long by 10 cm wide, said tape is a solid, plastic strip having a layer of pressure-sensitive adhesive coated on said inner surface thereof, and said thin layer is a substantially continuous coating about one particle thick of quartz sand particles in the size range from about 0.002 to 0.250 mm, said sand particles being held by said adhesive layer and being interspersed with a network of capillary spaces that are conducive to the lateral spreading of water along said layer.

8. The device defined in claim 7, wherein the width of said tape is less than the width of said flower pot, said tape is unperforated and said tape is centrally located on said block surfaces.

9. The device defined in claim 7, wherein the width of said tape is more than the width of said flower pot, said tape is perforated and said tape is centrally located on said major block surfaces.

10. In combination, a shallow container; a quantity of water in said container; a porous, open-celled block having substantially parallel, opposed, planar major block surfaces resting in said container on one of said major surfaces; a plastic tape wrapped around said block covering at least half of each of said major surfaces, said tape having an inner tape surface facing said major block surfaces; a thin, single-particle-thick layer of quartz sand particles about one grain thick attached to said inner tape surface and in close non-adherent relation with said block surfaces, said particles being interspersed with a network of capillary spaces that are conducive to lateral spreading of water along said sand layer; a flower pot having a bottom wall with a drain hole therethrough resting on the other of said major block surfaces and said tape, said flower pot having a quantity of soil therein and a plant rooted in said soil.

11. A device for continuously irrigating the soil in an individual flower pot and for supporting an individual flower pot within a water-bearing container, said flower pot having a bottom wall and a drain hole therethrough, said device comprising:

a porous, open-celled, rectangular block having substantially parallel opposed planar major block surfaces adapted in size to support a single flower pot thereon;

a plastic sheet wrapped around and covering the top surface of said block and the four side surfaces of said block;

a thin, single-particle-thick layer of cord sand attached to said plastic cover only along one inside block surface contacting said one block surface, whereby said device is placed within a water-bearing container and a potted plant is placed upon support such that water is placed in the water-bearing container to a predetermined level on said block.

12. A device as in claim 11, wherein said block includes a height of at least ¾" and a top block face surface area large enough to support a 4" diameter potted plant.

13. A device as in claim 11, wherein said block height is sized strategically for a particularly sized potted plant, such as a ¾" block height for a 4" potted plant in a linear scale.

* * * * *